Figure 1:
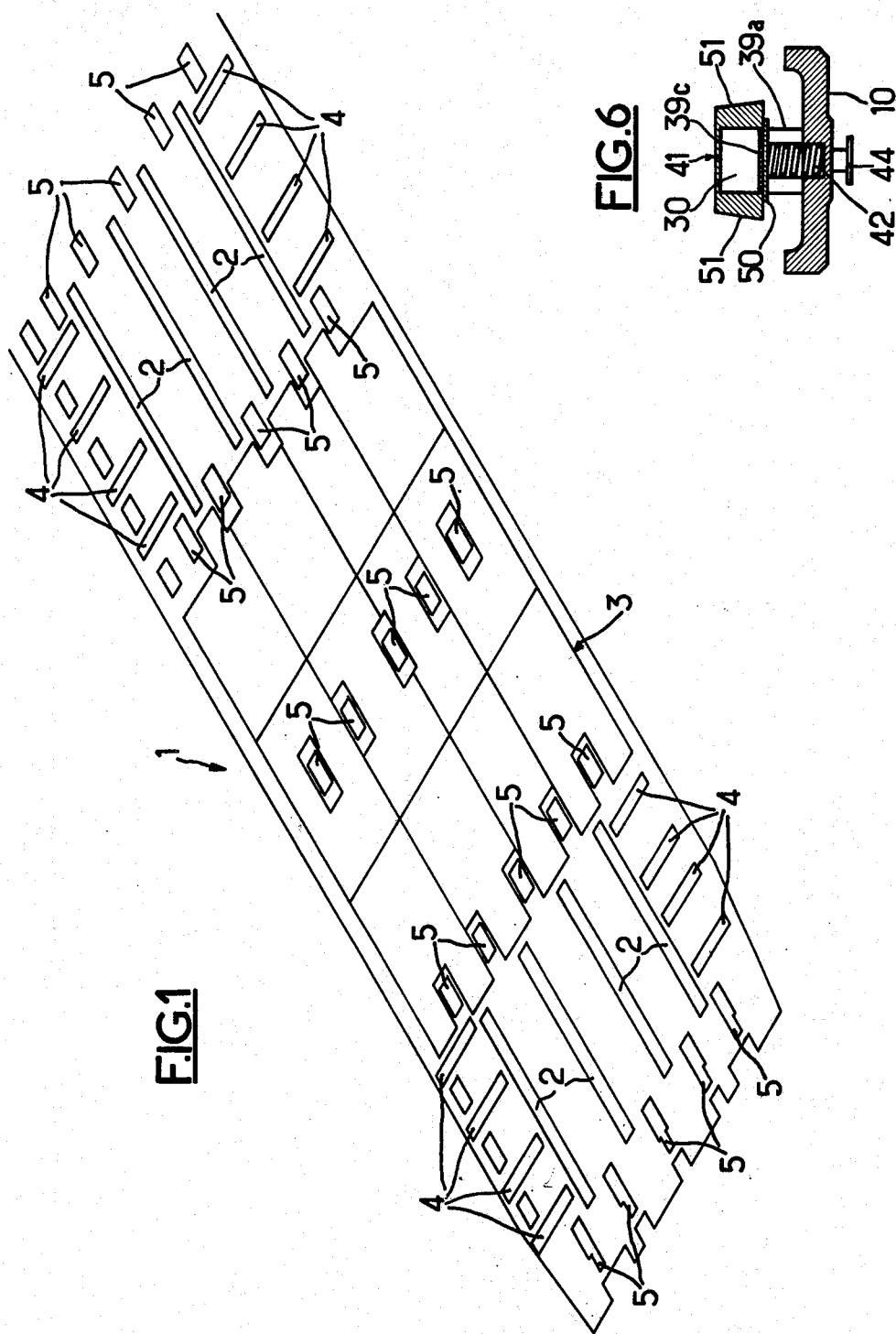

United States Patent [19]

Pelletier

[11] 4,089,275
[45] May 16, 1978

[54] PALLET LOCK

[75] Inventor: Robert Pelletier, Le Perreux, France

[73] Assignee: Societe d'Exploitation des Establissements H. Pelletier, Aubervilliers, France

[21] Appl. No.: 741,677

[22] Filed: Nov. 15, 1976

[30] Foreign Application Priority Data

Nov. 17, 1975 France .............................. 75 35020

[51] Int. Cl.² .............................................. B60P 7/08
[52] U.S. Cl. ................................................. 105/465
[58] Field of Search ............... 105/366 R, 366 C, 463, 105/464, 465; 244/118 R, 137 R; 296/35 A

[56] References Cited

U.S. PATENT DOCUMENTS

| 3,306,234 | 2/1967 | Hansen et al. ............. 105/465 X |
| 3,698,679 | 10/1972 | Lang et al. ............. 105/366 C X |

Primary Examiner—Robert G. Sheridan
Attorney, Agent, or Firm—Owen, Wickersham & Erickson

[57] ABSTRACT

A lock for stowage of freight in a vehicle includes two latches pivotally mounted transversely between two supporting spars and provided with anchor flanges for the freight. The latches are pivotable between open and closed positions. The lock includes a manual locking member mounted to be able to rotate about the pivot axis of the two latches, one latch cooperating with a locking lever which is able to rock about a transverse pivot fixed to the spars. The latches have bearing surfaces which cooperate with the locking member in the open and closed positions. The lock in accordance with the invention is specially applicable to the stowage of freight in the bays of freight aircraft.

14 Claims, 6 Drawing Figures

PALLET LOCK

This invention relates to a lock for the stowage of freight in a vehicle, and especially for the stowage of containers of pallets in the bay of an aircraft.

In vehicles, such as aircraft, which have to travel at high speed, the containers or pallets containing the cargoes to be carried may weigh up to several tons and must nevertheless by solidly stowed on the platform of the bay of the vehicle by suitable devices in order to reduce to an absolute minimum the risk of movement of these pallets during flight or in the event of rough landings.

Locks of this type are known which comprise two latches arranged transversely pivotally between two supporting spars and which are provided with anchor flanges for containers or pallets. Locks of this type also comprise means for making the latches pivot between a locking position in which the latches project with respect to the spars and hold the pallets solidly by their anchor flanges and an unlocked position in which the latches are depressed between the spars.

In one of the known locks the latches are controlled by a stop which is actuated manually and is located between the spars, this stop being able to slide by engagement of its opposite ends in slides arranged inside the spars and having locking notches for the stop. Under certain conditions of transport of the freight, for example at the time of a violent shock, there is a risk of the stop coming out of the notches and moving inside the slides, so that this lock does not ensure maximum safety in the transport of cargo. Again, the operations of locking and unlocking must be carried out manually. They are therefore lengthy and not very convenient for the operator, who must bend down for each operation. In the case of a freight aircraft, the length of time for the operations necessary for the correct positioning and locking or unlocking of the pallets increases the time necessary for intermediate stops, and this is injurious to optimum utilisation of the freight line concerned.

An object of the present invention is to overcome these disadvantages by producing a lock which can easily be unlocked by foot, and in which the safety of the locking is increased as compared with the known types of lock. The lock is easy to lock by hand, so as to speed up the necessary operations.

According to the invention, a lock for stowage of freight in a vehicle, such as the stowage of containers or pallets in the bay of an aircraft, comprises two supporting spars; two latches arranged transversely between the spars and hinged pivotally about a transverse axis so that they can be pivoted between a locked position and an unlocked position; a flange on each latch for anchorage of the freight; a locking member mounted to pivot about said transverse axis between the latches; and a bearing surface on each latch for engagement with the locking member respectively in the locked and unlocked positions of said latches, the bearing surfaces being so arranged as to enable easy access to the locking member in the unlocked position for locking the latches.

In a lock in accordance with the invention the locking member may therefore be easily manipulated by an operator in order to enable him to pull the latches up to their locking position without difficulty.

Preferably, one of the two latches is mounted pivotally about a fixed transverse spindle carried by the spars of the lock, and the second latch cooperates with a locking lever which is able to rock about a transverse pivot fixed to the spars.

When the locking member is pulled manually, the locking lever turns about its pivot and engages with the second latch when the latter has reached its locking position.

In a preferred embodiment of the invention the second latch is provided at its foot with a transverse pin the ends of which are engaged slidingly in two slideways arranged inside two side arms of the locking lever, and each slideway includes at its end adjacent to the latches a notch which forms a stop for receiving the pin at the time of locking of the latches.

When the locking member is pulled, starting from the unlocked position of the latches, the pin on the second latch slides in the slideways in the lever which turns about its pivot. The pin then comes into engagement with the notches to lock the latches in their locked position whilst the lever returns to its starting position.

In accordance with a further perferred embodiment of the invention, the upper face of the lever is substantially in the same plane as the upper face of the spars, the lock being assumed horizontal. By virtue of this feature, a pallet fixed by means of the lock in accordance with the invention rests on the lever, which cannot be unlocked as long as the pallet remains in position. The safety of the fixing of the freight is thus significantly improved.

Figure 2:
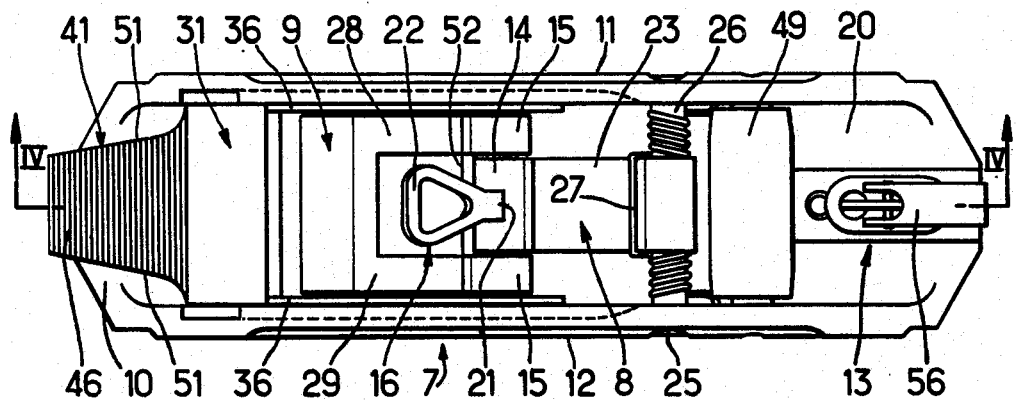
Figure 3:
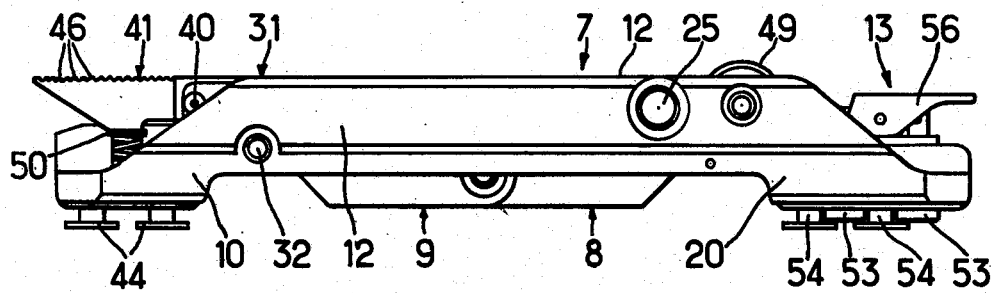
Figure 4:
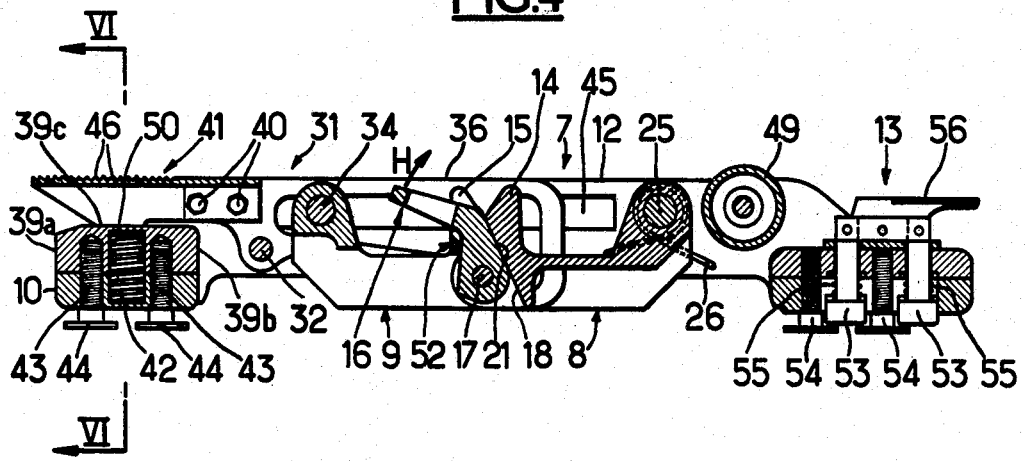
Figure 5:
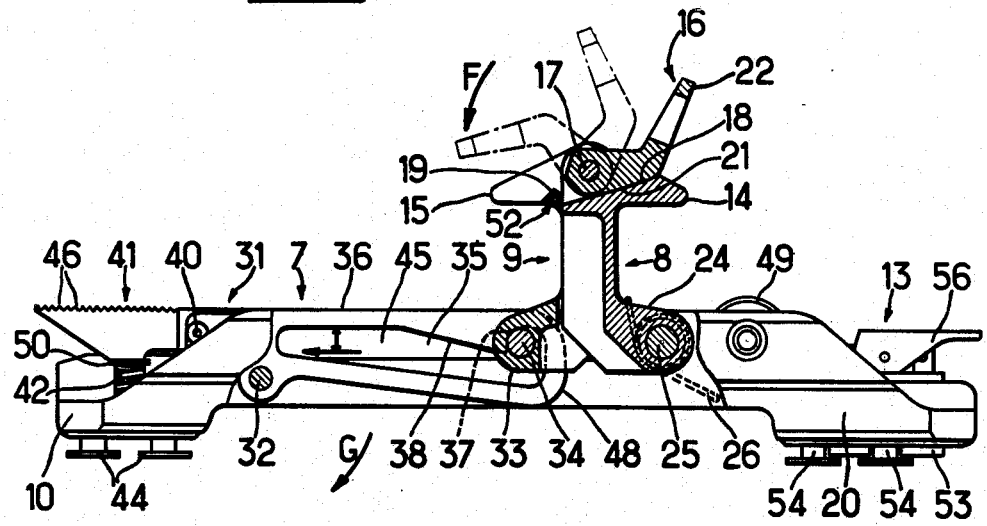

One embodiment of the invention will now be described, by way of example, with reference to the accompanying drawings, in which:

FIG. 1 is a perspective diagram of the platform of a freight bay in an aircraft, FIG. 2 is a plan view of one form of freight stowage lock in accordance with the invention, FIG. 3 is a front elevation of the lock of FIG. 2, FIG. 4 is a longitudinal section along a line IV—IV of FIG. 2, showing the lock in the unlocked position, FIG. 5 is a longitudinal section similar to FIG. 4, showing the lock in the locked position, and FIG. 6 is a transverse section along a line VI—VI of FIG. 4.

FIG. 1 shows a platform 1 of a freight bay for a vehicle which has to move at high speed, such as a freight aircraft. The platform 1 includes parallel longitudinal rails 2 equipped with transverse rollers and side guides 4 which frame a central platform 3 provided with a set of balls (not shown) spaced uniformly over its whole area. Locks 5 are distributed at the ends of the roller rails 2 as well as in the central platform 3. In the embodiment shown, five transverse rows of locks 5 are thus distributed from one end of the platform 1 to the other.

In order to load and fix containers or pallets on to the platform, they are in general brought through a side door of the vehicle on to the platform 3, then they are pushed along the roller rails 2 up to a predetermined location between two rows of locks 5. These are then locked in order to fix the pallet solidly at its location for the whole of the time of shipment.

Referring to FIGS. 2 to 6, an example of a lock in accordance with the invention will now be described, with which the freight bay platform 1 shown in FIG. 1 may be equipped.

The lock 7 comprises two latches 8 and 9 arranged transversely and pivotally between two parallel metal supporting spars 11 and 12 formed integrally with interconnecting end brackets 10 and 20. The lock 7 is attached to the platform 1 of the bay by a device 13 which is fixed to the bracket 20 through which it passes. The device 13, which is known per se, includes a handle 56 for moving two fingers 53. These fingers cooperate with two fixed fingers 54 and are associated with two return springs 55. The fingers are engageable in a suitable channel in the platform 1. The latches 8 and 9 comprise flanges 14 and 15, respectively, which are used for anchorage of the pallets, which to this end are equipped with projecting edges which engage under the flanges 14 and 15. The latch 9 is equipped with two side flanges 15 which frame the central flange 14 of the latch 8.

The latches 8 and 9 can pivot between a locked position shown in FIG. 5 in which they are projecting vertically with respect to the spars 11 and 12, and an unlocked position shown in FIG. 4 in which the latches 8 and 9 are retracted between the spars 11 and 12.

The lock also includes a locking ring member 16 mounted to rotate about a transverse axis about which the latches 8 and 9 are hinged pivotally on opposite sides of the ring 16. The flange 14 has a bearing surface 18 (FIGS. 4 and 5) which acts as a bearing for the ring 16 in its locked and unlocked positions. The ring 16 includes a foot 21, one of the faces of which is offset from a loop handle 22 at an angle of about 120° in the embodiment shown, the bearing surface 18 of the flange 14 having a sufficient area for receiving the foot 21 when the latches 8 and 9 are in the locked position (FIG. 5). The area of the bearing surface 18 is slightly inclined to the horizontal, if the lock 7 is assumed horizontal.

The other face of the foot 21 of the ring 16 is shaped so as to come into contact with a bearing surface 19 on the second latch 9 in the unlocked position. The bearing surface 19 is formed substantially at the centre of a crossbar 52 connecting the side flanges 15 on the latch 9. In this unlocked position shown in FIG. 4, the foot 21 is therefore wedged by its two faces between the bearing surface 18 on the latch 8 and the bearing surface 19 on the latch 9. The dimensions of the foot 21 and the slopes of its faces and of the bearing surfaces 18 and 19 are chosen so that the latches 8 and 9 are completely retracted in this position. Moreover, the angle between the foot 21 and the loop handle 22 of the ring 16 is such that in this unlocked position the loop is inclined slightly upwards and is easy to grasp with the finger so that during the locking operation the ring 16 is easily accessible and can properly play its part as an actuating lever for the latches 8 and 9.

The latch 8 includes a central portion 23 (FIG. 2) connecting the flange 14 to a tubular foot 24 mounted pivotally about a fixed transverse spindle 25, the ends of which are retained in the spars 11 and 12. A helical spring 26 is wound round the tubular foot 24 and includes a central part 27 (FIG. 2) which straddles the central portion 23 of the latch 8, forcing it resiliently towards the inside of the lock in the direction indicated by the arrow F (FIG. 5). The latches 8 and 9 are therefore urged by the spring 26 towards the unlocked position shown in FIG. 4. The central portion 23 of the latch 8 is hinged about the spindle 17 between two side arms 28 and 29 of the latch 9, whilst the foot 21 of the ring 16 is recessed into the flange 14 as is clearly seen in FIG. 2. The arms 28 and 29 are connected at the level of their end flanges 15 by a crossbar 52 (FIG. 2) in the centre of which is arranged the bearing surface 19. The ring 16 is wedged between the bearing surface 19 and the bearing surface 18 in the unlocked position (FIG. 4).

The latch 9 cooperates with a locking lever 31 which can rock about a transverse pivot 32 fixed to the spars 11 and 12. The latch 9 is provided at its foot 33 with a transverse spindle 34 the ends of which slidingly traverse two similar slideways 35 (FIG. 4 and 5) arranged inside two parallel side arms 36 of the lever 31. The ends of the spindle 34 are engaged slidingly in two longitudinal recesses 45 formed in the spars 11 and 12 between the spindle 25 and the pivot 32. The arms 36 arranged between the latch 9 and the spars 11 and 12 are urged continuously against the ends of the spindle 34 under the action of resilient means which will be described later.

Each slideway 35 includes at its end 48 adjacent to the latches 8 and 9 a semi-circular notch 37 (FIG. 5) forming a stop for receiving the spindle 34 upon locking of the latches 8 and 9. The notches 37 are elongated in the direction of the pivot 32 by planes 38 which are inclined with respect to the upper faces of the arms 36 of the lever 31. In the embodiment illustrated, the inclined planes 38 extend over substantially half the length of the arms 36.

The upper face of the lever 31 is located substantially in the same plane as the upper face of the spars 11 and 12, the upper faces being those which are at the top when the lock is located horizontally as shown in the drawings.

The lock 7 further includes means for urging the lever 31 resiliently to rotate in the direction which is opposite to unlocking of the latches 8 and 9, that is to say in the direction indicated by the arrow G (FIG. 5). In the embodiment illustrated, the urging means consists of two rigid blocks 39a and 39b connected at their top portions by a bridge 39c and fixed by bolts 44 on to the end bracket 10 under a recess 30 in that end 41 of the lever 31 which is opposite to the notches 37 (FIG. 6). A helical spring 42 is fixed to the bracket 10 under the bridge 39c between the two blocks 39a, 39b. The spring urges a small transverse metal plate 50 away from the bracket 10. This plate engages, under the bridge 39c, with the feet of two side arms 51 which bound the recess 30 in the end 41 (FIG. 6). The end 41 is attached to the arms 36 by bolts 40.

Under the action of the spring 42, the plate 50 thrusts against the arms 51 of the end 41 of the lever 31, which tends to make the lever 31 turn about its pivot 32. Hence, the arms 36 are forced against the ends of the transverse spindle 34 of the latch 9, the bridge 39c forming a stop for the plate 50 in order to limit the rotation of the lever 31.

In a manner already known per se, attachments 43 are secured in the bracket 10 and in the blocks 39a and 39b, and when the lock 7 is in service enlarged heads of the attachments 43 are engaged in a cavity rail in the platform 1 of the freight bay. Any suitable number of attachments may be used. For example four are used in the embodiment illustrated.

The end 41 of the lever 31 has a trapezoidal upper area (FIG. 2) for receiving the foot of an operator for unlocking the latches 8 and 9. The area advantageously has transverse grooving 46 to reduce slipping of the foot on the area.

The lock 7 is also provided, in a known fashion, with a transverse roller 49 attached to the spars 11 and 12 between the fixing device 13 and the latch 8.

Operation of this lock in accordance with the invention is as follows.

In the unlocked position shown in FIG. 4, the latches 8 and 9 and the ring 16 are held retracted inside the spars 11 and 12 under the action of the spring 26. The ring 16 rests against the bearing surface 19 on the latch 9, the spindle 34 of which is located adjacent the ends of the slideways 35 opposite to the notches 37. Under the action of the spring 42, the arms 36 bear against the spindle 34, and the ring 16 is, in addition, forced by way of its foot 21 into contact with the bearing surface 18.

When a first pallet is loaded into the freight bay of the vehicle and is brought up against a fixed end-stop which is in itself known, the locks 7 which must fix the pallet in the desired location have to be locked. The operator engages one or two fingers inside the triangular loop handle 22 of the ring 16 and pulls it up in the direction of the arrow H (FIG. 4). The ring pivoting about its axis 17 remains in contact, at its foot 21, with the bearing surface 18, so acting as an actuating lever which simultaneously raises the latches 8 and 9 by making the latch 8 pivot about the transverse spindle 25. At the same time, the spindle 34 of the latch 9 slides along the slideways 35 towards the latch 8. During the course of this movement, the spindle 34 bears along the inclined planes 38 and thereby slightly raises the lever 31 which rocks about its pivot 32.

The latches 8 and 9 therefore effect a rotation of 90° in a vertical plane against the opposing action of the spring 26, and they are latched in this locked position (FIG. 5) when the transverse spindle 34 is engaged in the notches 37. The action of the spring 42 against the lever 31 urges it firmly against the two ends of the spindle 34 which are engaged in the notches 37 and are retained in the recesses 45. In this position the flanges 14 and 15 are substantially horizontal, whilst the locking ring 16 may rest either against the bearing surface 18 as shown in full line in FIG. 5, or against the bearing surface 19, or in intermediate positions, such as those shown in dash-dot lines in FIG. 5, for supplementary stowage of packages. The bottom of the pallet is then engaged under the flange 14 of the lock 7. When the same operations have been repeated for all the loads constituting one line of stowage, a second pallet may be engaged under the flange 15 on the side opposite to the preceding ones. The pallets are thus solidly stowed despite the longitudinal stresses which they may undergo during their transport, that is to say, against stresses in the direction of the longitudinal axis of the lock.

The pallet fixed by the latch 9 rests along the whole length of the lever 31 at the same time as on the upper faces of the spars 11 and 12, due to the fact that the latter are at the same level as the upper faces of the arms 36 of the lever 31. Hence, the latches 8 and 9 can no longer be unlocked once the pallet has been fixed by the lock 7, which very substantially improves the safety of transporting the pallets.

On the other hand, the lifting ring 16 and the arrangement of the bearing surfaces 18 and 19 facilitate locking of the latches 8 and 9 are compared with known devices, especially the aforesaid known device with a sliding stop. Unlocking is also facilitated, since it is sufficient to exert pressure with the foot on the end 41 of the lever 31 to make the latter turn about the pivot 32, which frees the spindle 34 from the notches 37. The action of the spring 26 against the latch 8 then tends to fold it and the latch 9 down inside the spars 11 and 12 as far as their unlocked position shown in FIG. 4. During the course of this movement the latch 8 pivots about its spindle 25, whilst the spindle 34 slides along the inclined planes 38 up to the vicinity of the end of the slideways 35 adjacent the pivot 32. The ring 16 prevents the tilting of the latches 8 and 9 from continuing beyond their position shown in FIG. 4, by coming to the stop against the transverse crossbar 52 connecting the arms 28 and 29 of the latch 9.

The operations of locking and unlocking are therefore facilitated and accelerated as compared with known locks, which enables a reduction in the time which is necessary for loading and stowing of the freight, and consequently a reduction in the staff necessary for these operations. The result is that the time taken by intermediate stops in the case of freight aircraft can be reduced, which tends to improve the profitability of transporting freight.

The invention is not limited to the embodiment described, and may include other embodiments. Thus, the inclined planes 38 might be prolonged practically up to the end of the slideways 35. The grooves or scores 46 on the lever 31 might be replaced by a non-skid substance. The blocks 39a and 39b and the spring 42 might be replaced by any other system tending to make the lever 31 pivot towards the inside of the spars 11 and 12.

Besides its use in aircraft, the invention is applicable, for example, to the lorries used for transferring "airload" pallets or to the transport of goods in trains running at high speeds.

I claim:

1. A lock for stowage of freight in a vehicle, such as the stowage of containers or pallets in the bay of an aircraft, comprising
    two supporting spars;
    two latches arranged transversely between the spars and hinged pivotally about a common transverse axis so that they can be pivoted between a locked position and an unlocked position, each said latch having a flange for anchorage of the freight;
    a locking handle mounted to pivot about said common transverse axis between the latches, said locking handle including:
    a foot portion having a first surface for contact with a first bearing surface of said flange of one said latch, and a second surface for contact with a second bearing surface of said flange of the other said latch, in such a way that said foot portion is wedged by its two surfaces between said bearing surfaces on said latches when the latches are in the unlocked position, and
    a loop portion at the opposite end of said handle from said foot portion and offset from said surfaces of said foot portion to locate said loop portion in a position easily accessible when the latches are in the unloaded position where it can be moved for actuating the latches to their locked position.

2. A lock as claimed in claim 1, in which said loop portion makes an angle with said foot portion such that in the unlocked position the loop portion is inclined slightly upwards and is easy to grasp with the finger.

3. A lock as claimed in claim 2, in which the bearing surface of said one latch when cooperating with said foot portion of said locking handle is slightly inclined to the horizontal when the lock is held horizontal and is in the locked position.

4. A lock as claimed in claim 2, in which the flange of one of the latches is a central anchor flange having said bearing surface for said foot portion of said locking handle, and wherein the flange of the other latch includes side anchor flanges framing the central flange and connected by a crossbar at the centre of which is its said bearing surface.

5. A lock as claimed in claim 1, having
a fixed transverse spindle carried by the spars, a first said latch being pivotally mounted about said spindle,
a transverse pivot fixed to the spars, and
a locking lever which is able to rock about said transverse pivot, a second said latch cooperating with said locking lever.

6. A lock as claimed in claim 5, having
slideways which are arranged inside side arms of the locking lever, said transverse spindle being mounted for sliding movement in said slideways,
said slideways including at their end adjacent the latches a notch which forms a stop and is provided for receiving the transverse spindle of the second latch when the latches are in the locked position,
the notches being movable upwards by pivoting of the lever to enable freeing of the transverse spindle and unlocking of the latches.

7. A lock as claimed in claim 6, in which the free end of the lever is provided with non-skid means for receiving the foot of an operator for unlocking the latches.

8. A lock as claimed in claim 6, in which the notches are elongated towards the pivot of the lever by planes inclined with respect to the upper faces of the arms of the lever.

9. A lock as claimed in claim 5, in which the ends of the transverse spindle which slide in the slideways are engaged slidingly in longitudinal recesses arranged inside the spars.

10. A lock for stowage of freight in a vehicle, such as the stowage of containers or pallets in the bay of an aircraft, comprising:
two supporting spars,
first and second latches arranged transversely between said spars and hinged pivotally about a common transverse axis, so that they can be pivoted between a locked position and an unlocked position, each said latch having a flange for anchorage of the freight,
a locking handle mounted to pivot about said transverse axis between said latches,
a fixed transverse spindle carried by the spars, said first latch being mounted pivotally about said spindle,
a transverse pivot fixed to the spars,
a locking lever mounted to rock about said spars, said lever having side arms with slideways arranged inside them, and
a slidable transverse spindle slidably mounted in said slideways,
said second latch being mounted pivotally about said slidable transverse spindle,
said slideways including, at their end adjacent the latches, stop means for receiving and retaining said slidable transverse spindle when the latches are in locked position, said stop means being actuatable upon rocking movement of said locking lever.

11. A lock as claimed in claim 10 in which said stop means comprises a notch provided in each said slideway, said side arms with its slideways and notches being movable upwards by pivoting said locking lever to enable freeing of the slidable transverse spindle and unlocking both latches.

12. The lock of claim 11 wherein said notches are elongated towards the pivot of said lever by planes inclined with respect to the upper faces of the arms of the lever.

13. A lock as claimed in claim 10 wherein said lever has a free end provided with a non-skid surface for receiving the foot of an operator to aid in unlocking and latches.

14. A lock as claimed in claim 10 further comprising
stop means for limiting the rocking movement of said locking lever, and
spring means urging said locking lever in a direction opposed to the rocking movement unlocking the latches.

* * * * *

UNITED STATES PATENT AND TRADEMARK OFFICE
CERTIFICATE OF CORRECTION

PATENT NO. : 4,089,275
DATED : May 16, 1978
INVENTOR(S) : Robert Pelletier

It is certified that error appears in the above-identified patent and that said Letters Patent are hereby corrected as shown below:

```
Column 1, line  6, "of pallets" should read --or pallets--.
Column 2, line 55, after "platform" insert --1--.
Column 5, line 43, "loads" should read --locks--.
Column 5, line 61, "are compared" should read --as compared--.
Column 6, line  7, "the stop" should read --a stop--.
Column 6, line 56, "unloaded" should read --unlocked--.
Column 8, line 20, "actuatable" should read --actuable--.
Column 8, line 34, "unlocking and" should read --unlocking said --.
```

Signed and Sealed this

*Twenty-first* Day of *November 1978*

[SEAL]

Attest:

RUTH C. MASON
*Attesting Officer*

DONALD W. BANNER
*Commissioner of Patents and Trademarks*